(12) United States Patent
Chen (10) Patent No.: US 10,916,161 B1
(45) Date of Patent: Feb. 9, 2021

(54) ELECTRONIC SEAL OF MULTI-FREQUENCY TYPE

(71) Applicant: Chih-Chuan Chen, Nantou (TW)

(72) Inventor: Chih-Chuan Chen, Nantou (TW)

( * ) Notice: Subject to any disclaimer, the term of this patent is extended or adjusted under 35 U.S.C. 154(b) by 0 days.

(21) Appl. No.: 16/550,281

(22) Filed: Aug. 25, 2019

(51) Int. Cl.
| G09F 3/03 | (2006.01) |
| E05B 39/00 | (2006.01) |
| G08B 13/08 | (2006.01) |
| G06K 19/077 | (2006.01) |

(52) U.S. Cl.
CPC .......... *G09F 3/0329* (2013.01); *E05B 39/005* (2013.01); *G06K 19/0775* (2013.01); *G08B 13/08* (2013.01); *G09F 3/0317* (2013.01)

(58) Field of Classification Search
CPC .... G09F 3/0329; G09F 3/0317; E05B 39/005; G06K 19/0775; G08B 13/08
See application file for complete search history.

(56) References Cited

U.S. PATENT DOCUMENTS

| 8,659,496 B1 * | 2/2014 | Furey | H01Q 1/1214 343/860 |
| 8,699,216 B2 * | 4/2014 | Reber | G06F 1/182 361/679.26 |
| 9,086,114 B2 * | 7/2015 | Kashiwabara | F16F 13/08 |
| 2011/0273852 A1 * | 11/2011 | Debrody | G09F 3/03 361/747 |
| 2014/0191759 A1 * | 7/2014 | Olsson | G01V 3/08 324/329 |
| 2015/0062844 A1 * | 3/2015 | Bae | H04M 1/0249 361/752 |
| 2018/0033341 A1 * | 2/2018 | Weeks | G09F 3/0376 |

* cited by examiner

*Primary Examiner* — Mohamed Barakat
(74) *Attorney, Agent, or Firm* — Leong C. Lei (57) ABSTRACT

The present invention comprises a plug-bolt set with a circuit board and a detection antenna on a bolt-piece and a lock-seat set with a main antenna. The circuit board is set with a chip, a main circuit, and a secondary circuit. When the lock-seat and the bolt-piece are engaged and locked; the chip, the main circuit, and the main antenna are electrically connected to emit a first signal for providing the identification host to monitor, and controlling the secondary circuit to be electrically connected with the chip and the detection antenna to emit a second signal. The second signal can be used for the mobile phone software to do the quality control of the first signal. The first and second signals can be cut-off simultaneously when the plug-bolt is broken. This allows the end customer to do the actual test and quality control using the mobile phone.

15 Claims, 6 Drawing Sheets

ELECTRONIC SEAL OF MULTI-FREQUENCY TYPE

(a) TECHNICAL FIELD OF THE INVENTION

The invention especially refers to the technology that the end customer can previously do the actual test and quality control to test whether the electronic seal is functioning normally by using the mobile phone, so that it can be used in a discarding manner.

(b) DESCRIPTION OF THE PRIOR ART

The prior art is as shown by the inventor's approved patents U.S. Ser. No. 08/558,700B2, U.S. Ser. No. 08/866,609B2, and U.S. Ser. No. 09/508,271B2; however, after being reflected by the customer, since the spring is formed in one-piece in the lock-seat in those previous patents and in order to maintain the strength of the spring structure, the spring activity margin is not large. But, there is a tolerance when the circuit board is mounted on the plug-bolt and there is also a tolerance when the plug-bolt is engaged, lock and positioned in the lock-seat; it is inevitable that there will be the defective products in which the cumulative tolerance affects the spring activity margin. The result is that the plug-bolt and the lock-seat are manufactured separately and their quality controls are met; however, when the end customer engages and locks the plug-bolt and the lock-seat with each other to use it as a cargo-container seal, the signal will be invalid or the read rate will be deteriorated and the expected function of supervision will be lost, but the end customer cannot know from the actual test.

SUMMARY OF THE INVENTION

The main content of the present invention is that the circuit board of the electronic seal is provided with a chip, a main circuit, and a secondary circuit, wherein the secondary circuit is matched with a detection antenna.

And, when the plug-bolt and the lock-seat are used in engaging and locking; the main circuit, the chip, and the main antenna of the lock-seat are electrically connected to emit a first signal for providing the identification host to monitor, and controlling the secondary circuit to be electrically connected with the chip and the detection antenna to emit a second signal. The second signal can be used for the mobile phone software to do the quality control of the first signal to decide whether operating normally or not, and the first signal and the second signal can be cut-off simultaneously when the plug-bolt is broken. This can allow the end customer to do the actual test and quality control using the mobile phone, thus avoiding the use of defective products.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

As shown in FIG. 4 to FIG. 7, the electronic seal is composed of a plug-bolt A and a lock-seat B. The plug-bolt A can engage and lock the lock-seat B from top to bottom to lock door-bolt C of the cargo-container to provide the identification host of the customs to monitor the cargo-container whether being normally opened.

Please refer to FIG. 1 to FIG. 7, the plug-bolt A is mainly composed of a bolt-piece 10, a circuit board 20 and a detection antenna 24; wherein:

The bolt-piece 10 is made of a metal material of a relatively strong structure, which has a rod-body 11, a cap-head 12 radially and outwardly extending from the top end of the rod-body 11, and an accommodating-hole 13 penetrating through the top surface and the bottom surface; wherein the bolt-piece 10 is further recessedly set with an engaging-fit configuration 14 on the lower outer circumference ring. The circuit board 20 has a neck-shrinking section 201 that can be inserted into the accommodating-hole 13 from top to bottom, and an external-expansion section 202 is defined above the neck-shrinking section 201; which the bottom end of the external-expansion section 202 can be positioned on the cap-head 12 to make the neck-shrinking section 201 able to be suspended in the accommodating-hole 13. The circuit board 20 is further distributedly set with a main circuit 21 on the front surface of the neck-shrinking section 201 and is distributedly set with a secondary circuit 22 on the back surface, so that the main circuit 21 and the secondary circuit 22 can be distributedly set in a wide range on the upside and downside of the neck-shrinking section 201 and can be kept non-conducted with each other. Wherein, the main circuit 21 at least comprises a lower-contact point 211 set at the bottom surface of the neck-shrinking section 201, a starting point 212 set at the top edge of the neck-shrinking section 201, and an ending point 213 set at the top edge of the neck-shrinking section 201; as for the secondary circuit 22, it comprises a beginning point 221 and an terminal point 222 set at the top edge of the upside of the neck-shrinking section 201; therefore a chip 23 can be enabled to mount among the starting point 212, the ending point 213, the beginning point 221, and the terminal point 222. Wherein the chip 23 and the main circuit 21 can emit an RFID frequency band or a microwave frequency band; wherein the chip 23 and the secondary circuit 22 can emit a magnetic field frequency band which can provide a mobile phone software to do the quality control, and the magnetic field frequency band can be adopted by an NFC system or an LF system; in other words, the chip 23 is a system chip and has the pins which can emit at least two different frequency bands; and the pins correspond and connect with the starting point 212, the ending point 213, the beginning point 221, and the terminal point 222. The surface of the external-expansion section 202 is set with a detection antenna 24 in a spiral shape, and the detection antenna 24 is matched with the secondary circuit 22 and the chip 23 through the beginning point 221 and the terminal point 222 to form a closed-loop, wherein the closed-circuit shown in the figure is selected a serial connection. The top edge of the external-expansion section 202 is set with a startup unit 25, and the startup unit 25 can adopt a micro-motion type switch as shown in the figure; which the startup unit 25 can disconnect the detection antenna 24 and the secondary circuit 22. Additionally, the external-expansion section 202 and the outer periphery of the cap-head 12 are wrapped and covered with a waterproof sleeve W as shown in FIG. 4 to FIG. 7 for accurately and reliably assembling the circuit board 20 to the bolt-piece 10. As shown in FIG. 5, a gap G is maintained between the topmost end of the circuit board 20 and the waterproof sleeve W for releasing the startup unit 25; so that the startup unit 25 can keep disconnecting the electrical connection of the closed-loop of the detection antenna 24, the secondary circuit 22, and the chip 23. As for the lower-contact point 211, it is located at the maximum position of the bottom end of protruding-out the accommodating-hole 13; so as to facilitate an up-movement of the lower-contact point 211 by a set distance; since the waterproof sleeve W has been fixed to the cap-head 12, a differential movement will be produced between the circuit board 20 and the bolt-piece 10; therefore the circuit board 20 can be moved up to reduce the gap G, so that the startup unit 25 can be abutted and pressed on the waterproof sleeve W to switch; and the closed-circuit of the detection antenna 24, the secondary circuit 22 and the chip 23 can be quickly electrically connected.

Figure 1:
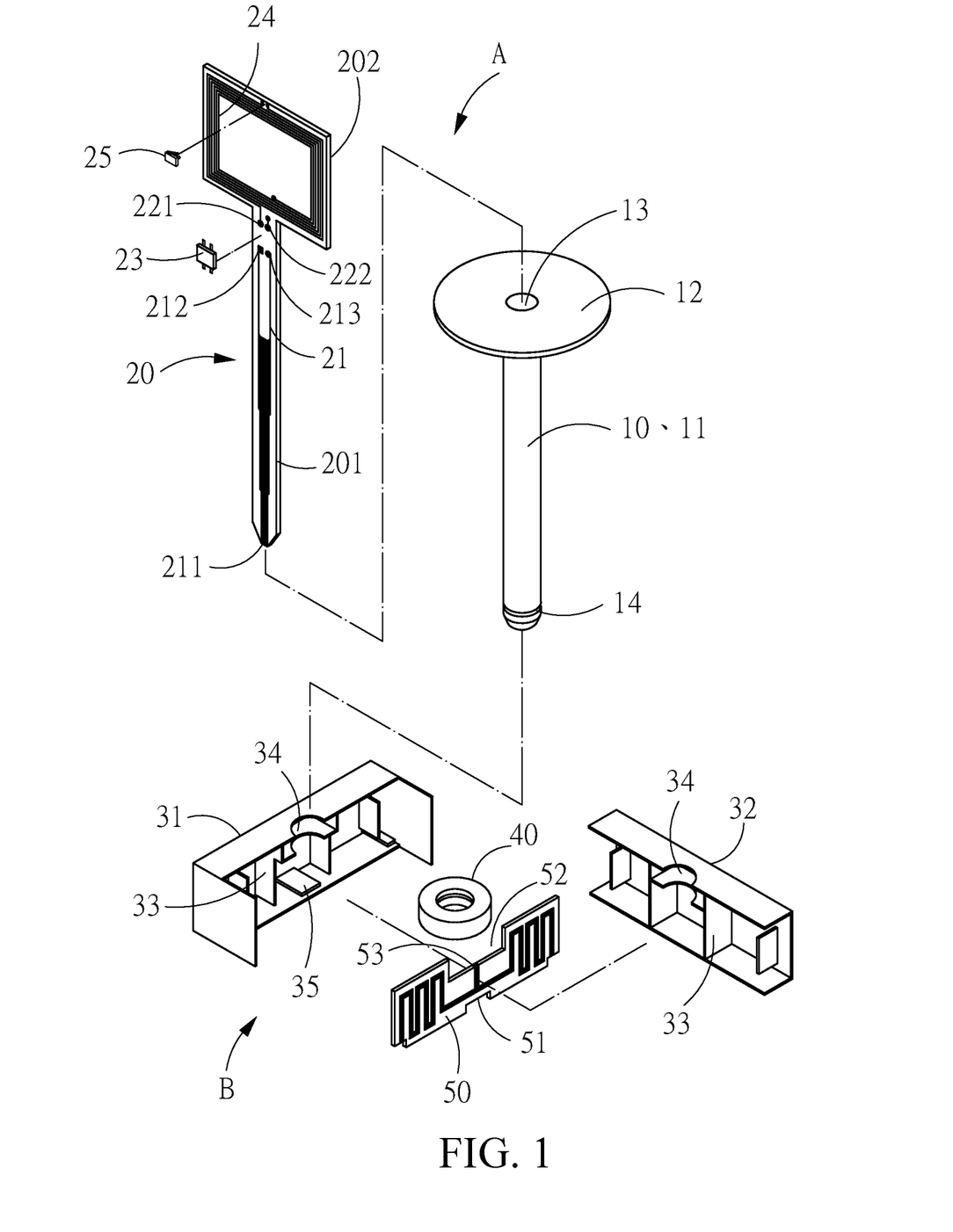
FIG. 1 is a decomposition schematic diagram of the present invention.
Figure 2:
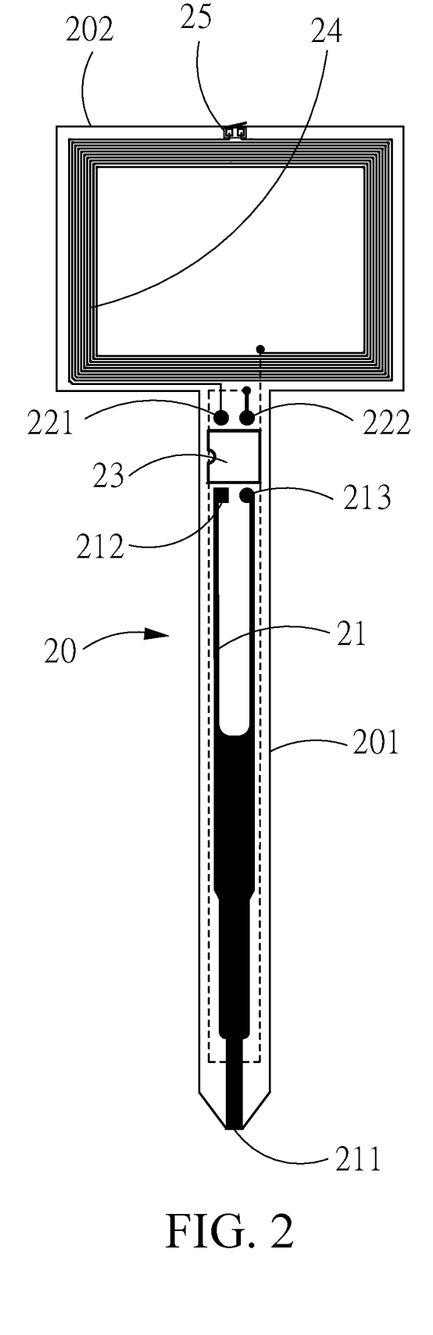
FIG. 2 is a front-view schematic diagram of the present invention.
Figure 3:
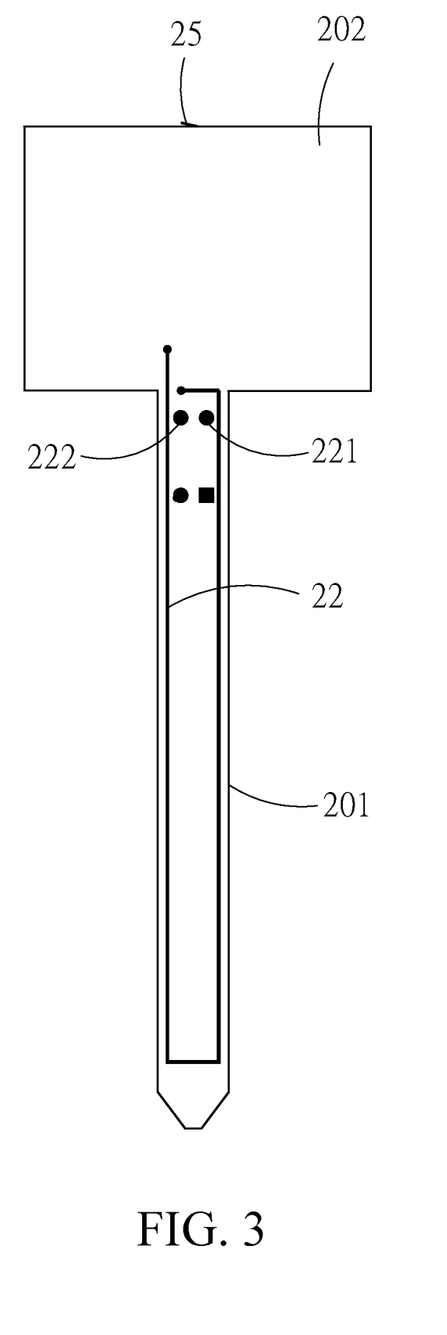
FIG. 3 is a rear-view schematic diagram of the present invention.
Figure 4:
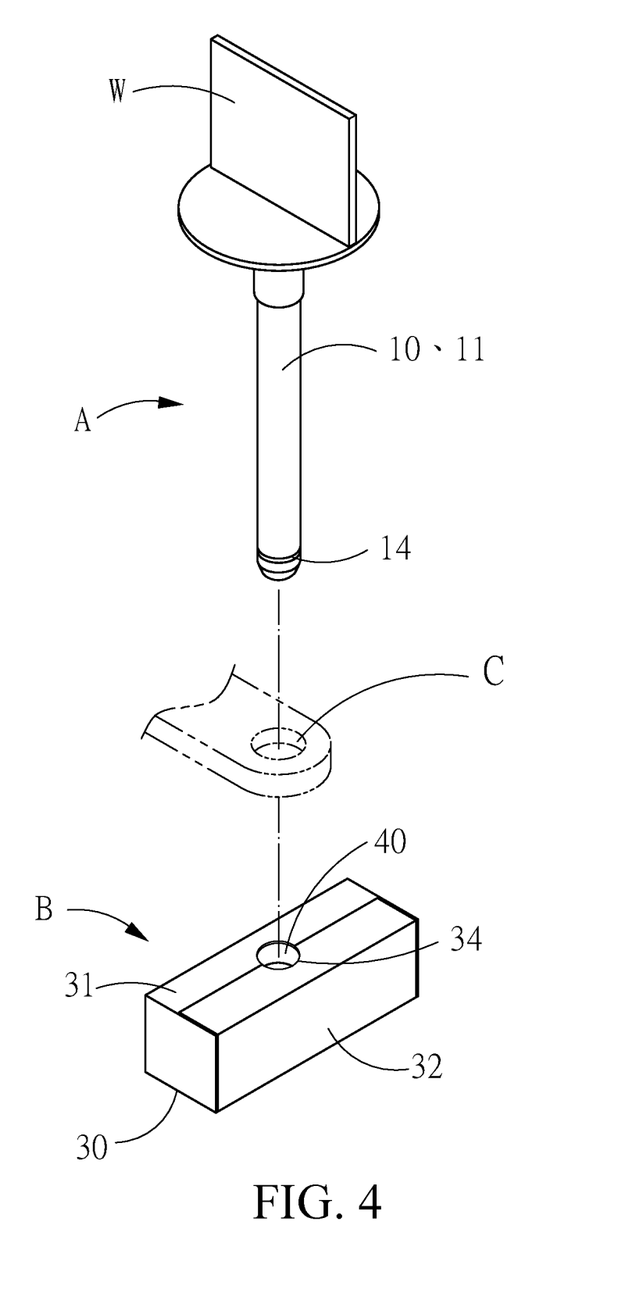
FIG. 4 and FIG. 5 are schematic diagrams of the positions of the plug-bolt, cargo-container door-bolt, and lock-seat of the present invention.
Figure 5:
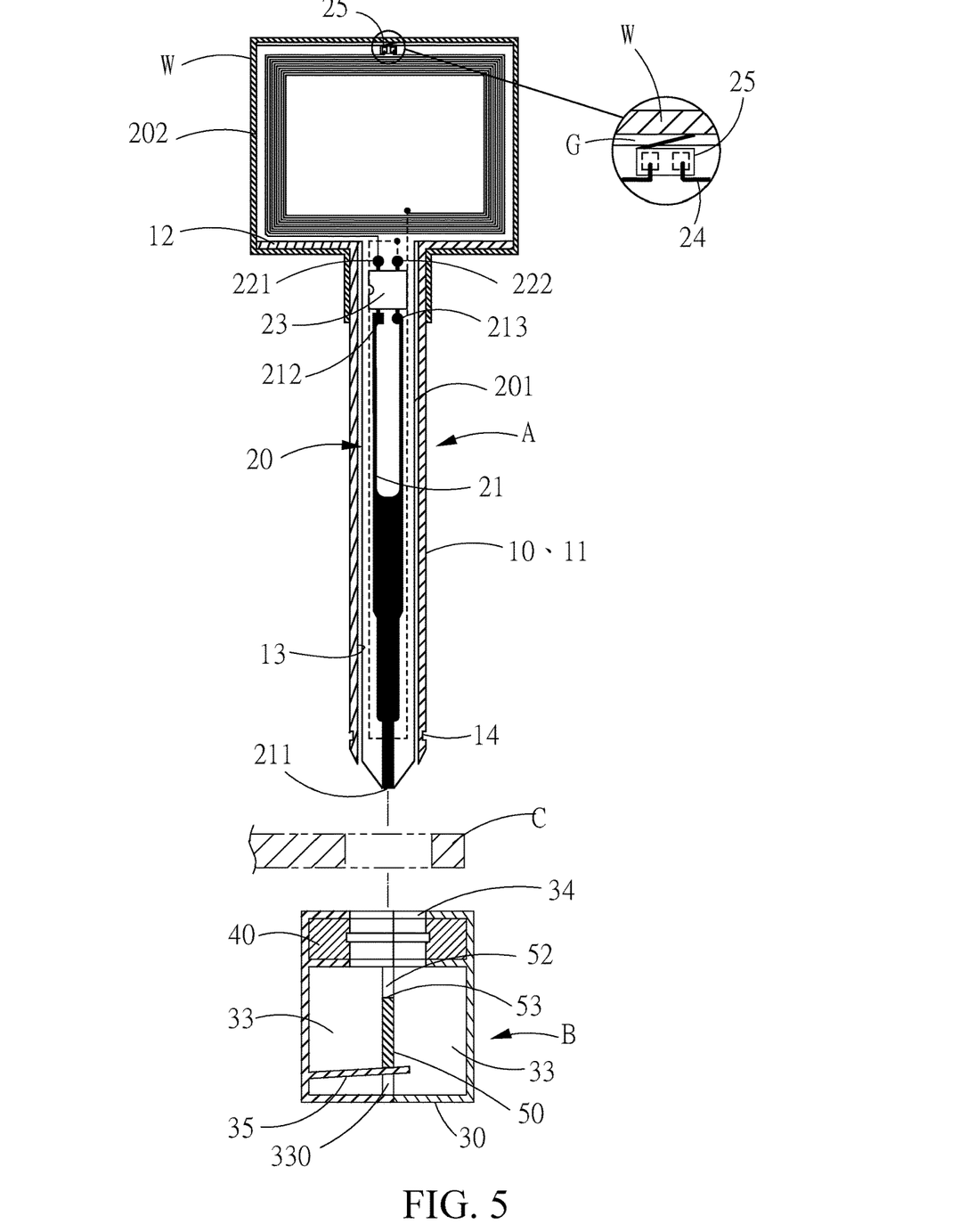
Figure 6:
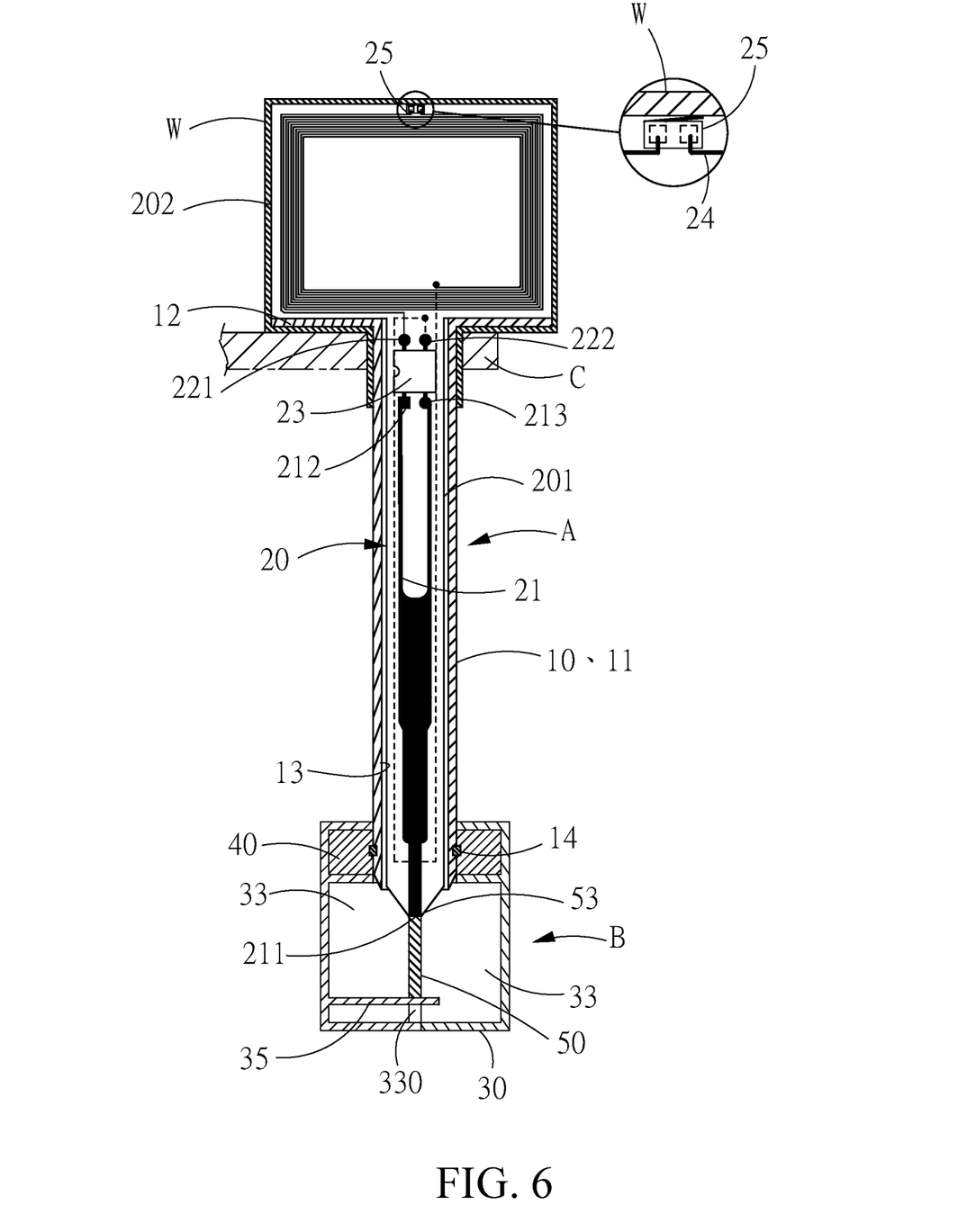
FIG. 6 is a combination cross-sectional schematic diagram showing the plug-bolt and the lock-seat are engaged and locked of the present invention.
Figure 7:
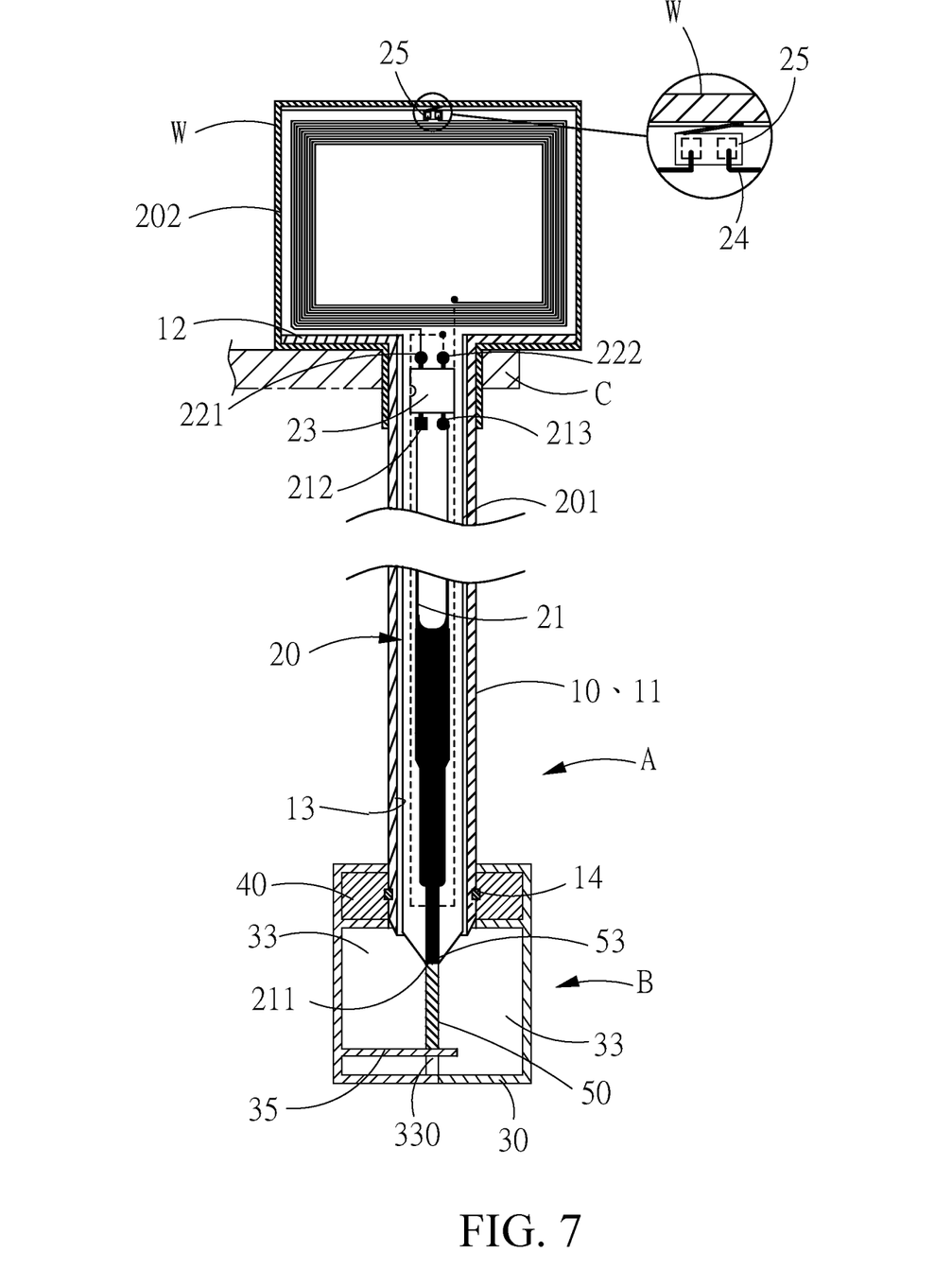
FIG. 7 is a cross-sectional schematic diagram of the destructed plug-bolt of the present invention.

Please cooperatively refer to FIG. 1, FIG. 4 and FIG. 5, the lock-seat B is composed of an outer shell 30, a buckle-ring 40, and a main antenna 50; wherein the outer shell 30 is face-to-face combined by a first shell 31 and a second shell 32 to form; and, a plurality of rail-plates 33 are formed inside to define the sliding space 330 as shown in FIG. 5 and FIG. 6. The outer shell 30 is recessedly set with a keyhole 34 from top to bottom to connect the top of the middle portion of the sliding space 330, and the buckle-ring 40 is mounted in the keyhole 34; wherein the outer shell 30 is integrally formed with an elastic unit 35 directly under the keyhole 34. As for the main antenna 50, it is slidably disposed in the sliding space 330, and the bottom end of the middle portion is set with a position-limiting portion 51 for inserting the free end of the elastic unit 35 to make the main antenna 50 have the tendency to position at the top-dead-point at any time; and, the top end of the middle portion of the main antenna 50 is downwardly set with a sag space 52, which the bottom surface of the sag space 52 is set with an upper contact point 53.

Please cooperatively refer to FIG. 5 and FIG. 6, during the insertion process; when the lower part of the bolt-piece 10 is inserted into the keyhole 34 to lock the door-bolt C of the cargo-container and the lower-contact point 211 enters the sag space 52 to electrically connect the upper contact point 53; the chip 23, the main circuit 21, and the main antenna can emit a first signal of the RFID frequency band or the microwave frequency band to provide the customs host for the identification and management. Then, the engaging-fit configuration 14 is stuck, engaged, and positioned on the buckle-ring 40 against the elastic unit 35, so that the bolt-piece 10 cannot be disengaged from the lock-seat B; at this time, the circuit board 20 can be pushed up by the elastic unit 35 preload, and further, the startup unit 25 touches and presses the waterproof sleeve W to switch; therefore the detection antenna 24, the secondary circuit 22 and the chip 23 are electrically connected to emit a second signal of the magnetic field frequency band. Therefore, the second signal can provide the mobile phone software to do the quality control of the first signal to decide whether operating normally or not, this can allow the end customer to avoid the use of defective products to ensure the effective supervision for the closed and locked status of the cargo-container. Therefore, the first signal and the second signal are in different frequency band configurations; please cooperate with FIG. 7, if wanting to normally open the door-bolt C of the cargo-container, it only needs to use hydraulic shear to break the middle portion of the bolt-piece 10; at the same time, the main circuit 21 and the secondary circuit 22 of the circuit board 20 are cut off, thereby interrupting the first and second signals.

The first signal and the second signal can have the same serial number (identification code) built in, so that the mobile phone and the customs host can determine whether the cargo-containers indicated by the serial number are the same.

The present invention indeed has the following advantages:

1. For the present invention, in the process of the plug-bolt A engaging and locking with the lock-seat B; the first signal is emitted first, and then the second signal is emitted, so that the second signal can be used for the mobile phone software to do the quality control of the first signal to decide whether operating normally or not; this allows the end customer to intercept defective products and enable the customs host to exactly monitor.
2. For the present invention, in the process of the plug-bolt A engaging and locking with the lock-seat B; a differential movement is generated between the circuit board 20 and the bolt-piece 10; so that the circuit board 20 can be pushed up by the reaction force of the main antenna 50 to switch the startup unit 25 to make the closed-circuit of the detection antenna 24, the secondary circuit 22, and the chip 23 emit a second signal; this configuration can ensure that when the plug-bolt A has not engaged and locked with the lock-seat B, the detection antenna 24 and the secondary circuit 22 will not randomly emit a second signal, so that the situation in which the first signal is misjudged can be removed.
3. For the present invention, the detection antenna 24 of the present invention is mounted above the bolt-piece 10 and the main circuit 21 and the secondary circuit 22 are arranged in a non-conducting manner, and the main antenna 50 is cooperatively and oppositely set under the bolt-piece 10; thereby controlling the main antenna 50 and the detection antenna 24 to maintain a maximum spacing, and the interference situation between the second signal and the first signal can be minimized.

I claim:

1. An electronic seal of multi-frequency type at least comprises:
    a plug-bolt set with a circuit board on a bolt-piece and a detection antenna, wherein the circuit board is set with a chip, a main circuit, and a secondary circuit; wherein the main circuit and the secondary circuit are arranged in a non-conducting manner, and the secondary circuit is matched with the detection antenna;

a lock-seat set with a main antenna, wherein the lock-seat provides for the bolt-piece to engage and lock; the chip, the main circuit, and a main antenna are electrically connected to emit a first signal for providing monitoring and to control the secondary circuit to be electrically connected with the chip and the detection antenna to emit a second signal;

wherein the second signal provides a mobile phone software to do the quality control of the first signal to decide whether operating normally or not, which the first signal and the second signal are in different frequency band configurations; when the plug-bolt is broken, the main circuit and the secondary circuit are simultaneously cut off, thereby interrupting the first and second signals.

2. The electronic seal of multi-frequency type according to claim 1, wherein the plug-bolt is set with a startup unit to control the secondary circuit and the detection antenna to keep open-circuit, but, after the plug-bolt engages and locks the lock-seat, a differential movement is produced between the circuit board and the bolt-piece; thereby the circuit board switches the startup unit to control the detection antenna, the secondary circuit, and the chip to electrically connect to emit a second signal.

3. The electronic seal of multi-frequency type according to claim 2, wherein the startup unit is a switch.

4. The electronic seal of multi-frequency type according to claim 2, wherein the detection antenna, the secondary circuit, and the chip are matched to form a closed-circuit and are installed on a board together.

5. The electronic seal of multi-frequency type according to claim 4, wherein the detection antenna, the secondary circuit, and the chip are in serial-connection configuration.

6. The electronic seal of multi-frequency type according to claim 2, wherein the bolt-piece has a rod-body, a cap-head radially and outwardly extending from the top end of the rod-body, and an accommodating-hole penetrating through a top surface and a bottom surface; wherein the circuit board has a neck-shrinking section that is inserted into the accommodating-hole, and the neck-shrinking section is set with the main circuit and the secondary circuit; wherein the circuit board has an external-expansion section set above the neck-shrinking section, and the external-expansion section is positioned on the cap-head; wherein the startup unit is set at the top edge of the external-expansion section and the detection antenna set on a surface; wherein the external-expansion section and the outer periphery of the cap-head are wrapped and covered with a waterproof sleeve; wherein a gap is maintained between the topmost end of the circuit board and the waterproof sleeve for releasing the startup unit to disconnect the electrical connection of the detection antenna, the secondary circuit, and the chip; but, after the plug-bolt engages and locks the lock-seat, the circuit board is moved up to reduce the gap to make the startup unit abut and press on the waterproof sleeve to electrically connect the detection antenna, secondary circuit, and the chip.

7. The electronic seal of multi-frequency type according to claim 3, wherein the bolt-piece has a rod-body, a cap-head radially and outwardly extending from the top end of the rod-body, and an accommodating-hole penetrating through a top surface and a bottom surface; wherein the circuit board has a neck-shrinking section that is inserted into the accommodating-hole, and the neck-shrinking section is set with the main circuit and the secondary circuit; wherein the circuit board has an external-expansion section set above the neck-shrinking section, and the external-expansion section is positioned on the cap-head; wherein the startup unit is set at the top edge of the external-expansion section and the detection antenna set on a surface; wherein the external-expansion section and the outer periphery of the cap-head are wrapped and covered with a waterproof sleeve; wherein a gap is maintained between the topmost end of the circuit board and the waterproof sleeve for releasing the startup unit to disconnect the electrical connection of the detection antenna, the secondary circuit, and the chip; but, after the plug-bolt engages and locks the lock-seat, the circuit board is moved up to reduce the gap to make the startup unit abut and press on the waterproof sleeve to electrically connect the detection antenna, secondary circuit, and the chip.

8. The electronic seal of multi-frequency type according to claim 4, wherein the bolt-piece has a rod-body, a cap-head radially and outwardly extending from the top end of the rod-body, and an accommodating-hole penetrating through a top surface and a bottom surface; wherein the circuit board has a neck-shrinking section that is inserted into the accommodating-hole, and the neck-shrinking section is set with the main circuit and the secondary circuit; wherein the circuit board has an external-expansion section set above the neck-shrinking section, and the external-expansion section is positioned on the cap-head; wherein the startup unit is set at the top edge of the external-expansion section and the detection antenna set on a surface; wherein the external-expansion section and the outer periphery of the cap-head are wrapped and covered with a waterproof sleeve; wherein a gap is maintained between the topmost end of the circuit board and the waterproof sleeve for releasing the startup unit to disconnect the electrical connection of the detection antenna, the secondary circuit, and the chip; but, after the plug-bolt engages and locks the lock-seat, the circuit board is moved up to reduce the gap to make the startup unit abut and press on the waterproof sleeve to electrically connect the detection antenna, secondary circuit, and the chip.

9. The electronic seal of multi-frequency type according to claim 5, wherein the bolt-piece has a rod-body, a cap-head radially and outwardly extending from the top end of the rod-body, and an accommodating-hole penetrating through a top surface and a bottom surface; wherein the circuit board has a neck-shrinking section that is inserted into the accommodating-hole, and the neck-shrinking section is set with the main circuit and the secondary circuit; wherein the circuit board has an external-expansion section set above the neck-shrinking section, and the external-expansion section is positioned on the cap-head; wherein the startup unit is set at the top edge of the external-expansion section and the detection antenna set on a surface; wherein the external-expansion section and the outer periphery of the cap-head are wrapped and covered with a waterproof sleeve; wherein a gap is maintained between the topmost end of the circuit board and the waterproof sleeve for releasing the startup unit to disconnect the electrical connection of the detection antenna, the secondary circuit, and the chip; but, after the plug-bolt engages and locks the lock-seat, the circuit board is moved up to reduce the gap to make the startup unit abut and press on the waterproof sleeve to electrically connect the detection antenna, secondary circuit, and the chip.

10. The electronic seal of multi-frequency type according to claim 6, wherein the main circuit at least comprises a lower-contact point set at the bottom surface of the neck-shrinking section, and a starting point and an ending point set above the lower-contact point; wherein the secondary circuit secondary circuit comprises a beginning point and a terminal point set at an upside of the lower-contact point; and the chip is mounted among the starting point, the ending point, the beginning point, and the terminal point; wherein the detection antenna is set on the surface of the external-expansion section in a spiral shape, and the detection antenna is matched with the secondary circuit and the chip through the beginning point and the terminal point to emit a magnetic field frequency band for providing the mobile phone software to do the quality control.

11. The electronic seal of multi-frequency type according to claim 1, wherein the detection antenna is set on the top surface of the bolt-piece, and the main circuit is set with a lower-contact point at the bottom end of the circuit board to match with the main antenna, thereby controlling the main antenna and the detecting antenna to maintain a spacing.

12. The electronic seal of multi-frequency type according to claim 2, wherein the detection antenna is set on the top surface of the bolt-piece, and the main circuit is set with a lower-contact point at the bottom end of the circuit board to match with the main antenna, thereby controlling the main antenna and the detecting antenna to maintain a spacing.

13. The electronic seal of multi-frequency type according to claim 3, wherein the detection antenna is set on the top surface of the bolt-piece, and the main circuit is set with a lower-contact point at the bottom end of the circuit board to match with the main antenna, thereby controlling the main antenna and the detecting antenna to maintain a spacing.

14. The electronic seal of multi-frequency type according to claim 4, wherein the detection antenna is set on the top surface of the bolt-piece, and the main circuit is set with a lower-contact point at the bottom end of the circuit board to match with the main antenna, thereby controlling the main antenna and the detecting antenna to maintain a spacing.

15. The electronic seal of multi-frequency type according to claim 5, wherein the detection antenna is set on the top surface of the bolt-piece, and the main circuit is set with a lower-contact point at the bottom end of the circuit board to match with the main antenna, thereby controlling the main antenna and the detecting antenna to maintain a spacing.

\* \* \* \* \*